(12) United States Patent
Hawkins et al.

(10) Patent No.: US 11,466,664 B2
(45) Date of Patent: Oct. 11, 2022

(54) SAFETY STOP ASSEMBLY

(71) Applicant: Siemens Gamesa Renewable Energy A/S, Brande (DK)

(72) Inventors: Samuel H. Hawkins, Vejle (DK); Mikkel Aggersbjerg Kristensen, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 332 days.

(21) Appl. No.: 16/604,320

(22) PCT Filed: Jan. 9, 2018

(86) PCT No.: PCT/EP2018/050421
§ 371 (c)(1),
(2) Date: Oct. 10, 2019

(87) PCT Pub. No.: WO2018/188821
PCT Pub. Date: Oct. 18, 2018

(65) Prior Publication Data
US 2020/0072193 A1   Mar. 5, 2020

(30) Foreign Application Priority Data
Apr. 12, 2017 (DE) .................... 10 2017 206 303.3

(51) Int. Cl.
*F03D 7/02* (2006.01)
(52) U.S. Cl.
CPC ......... *F03D 7/0264* (2013.01); *F03D 7/0224* (2013.01); *F03D 7/0244* (2013.01);
(Continued)
(58) Field of Classification Search
CPC .... F03D 7/0264; F03D 7/0224; F03D 7/0244; F03D 7/0276; F05B 2260/845;
(Continued)

(56) References Cited

U.S. PATENT DOCUMENTS

| 8,096,764 B2 * | 1/2012 | Steffensen ............ F03D 7/0264 416/26 |
| 2007/0024058 A1 | 2/2007 | McClintic |

(Continued)

FOREIGN PATENT DOCUMENTS

| CN | 1035547 A | 9/1989 |
| CN | 201092931 Y | 7/2008 |

(Continued)

OTHER PUBLICATIONS

Reply to the Written Opinion in EP 18702083 dated Apr. 15, 2020.*
(Continued)

*Primary Examiner* — Christopher Verdier
(74) *Attorney, Agent, or Firm* — Schmeiser, Olsen & Watts LLP (57) ABSTRACT

Provided is a safety stop valve arrangement of a hydraulic blade pitch system of a wind turbine, including an accumulator arrangement connected over a hydraulic line to a piston of the hydraulic blade pitch system; a redundant set of safety valves arranged between the accumulator arrangement and the piston; a small-orifice restriction nozzle arranged to determine a first rate of hydraulic fluid flow in response to a safety stop input; at least one speed-select valves arranged; and at least one large-orifice restriction nozzle arranged to determine a second rate of hydraulic fluid flow in response to a positive rotor acceleration input, wherein the second rate of fluid flow is faster than the first rate of fluid flow. A safety stop assembly of a wind turbine with hydraulic blade pitch systems and a method of performing a safety stop sequence is also provided.

13 Claims, 6 Drawing Sheets

(52) U.S. Cl.
CPC ...... *F03D 7/0276* (2013.01); *F05B 2260/845* (2013.01); *F05B 2270/1074* (2013.01); *F05B 2270/309* (2013.01); *F05B 2270/506* (2013.01); *F05B 2270/604* (2013.01)

(58) Field of Classification Search
CPC ........ F05B 2260/901; F05B 2270/1074; F05B 2270/309; F05B 2270/328; F05B 2270/506; F05B 2270/604; F05B 2270/107; F05B 2270/1077; F05B 2270/327
See application file for complete search history.

(56) References Cited

U.S. PATENT DOCUMENTS

| | | |
|---|---|---|
| 2010/0104439 A1 | 4/2010 | Nomaguchi et al. |
| 2010/0119369 A1 | 5/2010 | Risager et al. |
| 2012/0134816 A1* | 5/2012 | Andersen ............. F03D 7/0264 416/31 |
| 2012/0139240 A1 | 6/2012 | Echarte et al. |
| 2020/0182227 A1* | 6/2020 | Rogg ..................... F03D 80/50 |

FOREIGN PATENT DOCUMENTS

| | | | |
|---|---|---|---|
| DE | 102016013796 A1 * | 5/2018 | ........ F05B 2260/845 |
| EP | 2072815 A1 | 6/2009 | |
| EP | 2167814 A2 | 3/2010 | |
| EP | 2284391 A1 | 2/2011 | |

OTHER PUBLICATIONS

English Machine Translation of DE-102016013796-A1, Nov. 2, 2021.*
English Machine Translation of CN 201092931Y, Nov. 6, 2021.*
Office Action in related Chinese Patent Application No. 201880040103.7 dated Oct. 10, 2020. 9 pages.
International Search Report for application No. PCT/EP2018/050421 dated May 3, 2018.

* cited by examiner

FIG 9

SAFETY STOP ASSEMBLY

CROSS-REFERENCE TO RELATED APPLICATIONS

This application claims priority to PCT Application No. PCT/EP2018/050421, having a filing date of Jan. 9, 2018, which is based on German Application No. 10 2017 206 303.3, having a filing date of Apr. 12, 2017, the entire contents both of which are hereby incorporated by reference.

FIELD OF TECHNOLOGY

The following describes a safety stop valve arrangement of a hydraulic blade pitch system of a wind turbine; a safety stop assembly of a wind turbine with hydraulic blade pitch systems; a method of performing a safety stop sequence for a wind turbine; and a wind turbine with hydraulic blade pitch systems and such a safety stop arrangement for each hydraulic blade pitch system.

BACKGROUND

The aerodynamic rotor of a wind turbine comprises a rotatable hub and a number of rotor blades. The present invention relates to an aerodynamic rotor for which the rotor blades are pitchable, i.e. the rotor blades can be positioned relative to the incoming airflow using a pitching motion. The blades may be pitched so that the relative angle of attack of the blade surface enables the wind turbine to operate efficiently and optimize the kinetic energy which is transferred from the wind into the turbine rotor. Similarly the blades may be pitched so that they produce aerodynamic drag and decelerate the wind turbine rotor or to maintain stable energy production in high or varying wind speeds. Under certain conditions such as storm, loss of grid, failure or malfunction of a mechanical or electric component etc., a wind turbine may need to be shut down rapidly. An emergency shutdown should include a deceleration of the rotational movement of the aerodynamic rotor. However, the wind turbine controller should not be relied upon to control the pitch motion of the blades during such an emergency, since the wind turbine controller itself may fail to operate correctly or may even be the cause of the emergency.

Therefore, for reliable blade pitching during an emergency shutdown, an independent and robust system is required. In some countries or regions, safety standards may apply to any means used to respond to severe hazards such as wind turbine rotor overspeed. For example, the ISO 13849-1 standard specifies the requirements that must be fulfilled by a Performance Level "D" (PLd) safety function.

These requirements are very difficult to fulfil when a safety function depends upon an active control system relying on multiple sensor inputs and complex control loops. The availability of such systems may not be guaranteed during an emergency. Instead, an independent and passive control means is preferred. In the case of a wind turbine with hydraulic pitch control, one approach might be to store a reserve supply of hydraulic fluid under pressure and to pass this hydraulic fluid through the hydraulic line during an emergency shutdown to ensure a gradual and steady pitch motion. The rate of fluid flow through the hydraulic line is determined by the smallest cross-sectional area in the hydraulic line, and an upper limit for the fluid flow rate can be set by incorporating an appropriately sized restriction nozzle in the hydraulic line. The speed of the pitch motion during an emergency stop is therefore determined by the orifice size of the restriction nozzle. The pitch speed during an emergency shutdown would ideally be matched to the conditions of the shutdown event. A problem arises from the fact that the conditions associated with a shutdown due to rotor overspeed can be different from those associated with other types of emergency shutdown events. Rotor overspeed can arise when the rotor accelerates as a result of control failure, for example.

When designing a wind turbine where a single emergency pitch speed must be chosen, there are constraints which limit the choice of pitch speed from being neither too fast nor too slow. A sufficiently slow pitch speed must be chosen, otherwise the tower structure may be overloaded by negative thrust arising from rapid rotor deceleration during the stop. On horizontal axis wind turbines, negative thrust acts in the upwind direction and, if excessive, may exceed the structural limits of the tower design leading to a turbine collapse.

Conversely, a sufficiently fast pitch speed must be chosen in order to prevent the rotor from reaching an excessively high rotor speed and to avoid structural loading from positive rotor thrust caused by rotor overspeed. Positive thrust acts in the downwind direction and, in addition to applying forces to the tower structure on wind turbines with upwind rotors, the positive thrust may increase the blade tip deflection. This can result in catastrophic failure when a blade collides with the turbine tower.

In existing systems, it is very difficult to identify a single pitching speed that could fulfil both requirements. Some systems that address this problem provide ways of reducing the loading during emergency shutdown by using variable pitch speeds. However, these systems rely on complex control systems and therefore cannot be regarded as fail-safe passive control means. Other known emergency shutdown systems for turbines with hydraulic pitch units rely on carefully tuning the size of the hydraulic restriction nozzle to achieve a pitch speed that is fast enough to avoid high loading (during a rotor over-speed event), and at the same time slow enough to reduce the loading arising from a rapid loss of positive thrust. However, as wind turbine rotor diameters increase it is difficult to identify a pitching speed that will fulfil both requirements. None of the known solutions is able to provide a fail-safe emergency pitch system that allows both fast and slow pitch speed. To compensate for this, the tower and other structural components must be constructed to be stronger and heavier in order to withstand the high loading. These additional measures add significantly to the overall costs of a wind turbine.

SUMMARY

An aspect relates to provide a fail-safe emergency pitch system that allows both fast and slow pitch speeds, and that overcomes the problems mentioned above.

According to the embodiments of the invention, the safety stop valve arrangement of a hydraulic blade pitch system of a wind turbine comprises an accumulator arrangement connected over a hydraulic line to a piston of the hydraulic blade pitch system; a redundant set of safety valves arranged between the accumulator arrangement and the piston; a small-orifice restriction nozzle arranged in a hydraulic line to determine a first rate of hydraulic fluid flow in response to a safety stop input; at least one speed-select valves arranged in the hydraulic line; and at least one large-orifice restriction nozzle arranged to determine a second rate of hydraulic fluid flow in response to a positive rotor acceleration input, wherein the second rate of fluid flow is faster than the first rate of fluid flow. In the inventive safety stop valve arrangement, a speed-select valve is connected in line with a large-orifice restriction nozzle, i.e. in the same "branch" of the hydraulic circuit so that, when the speed-select valve is opened, a faster fluid flow rate is made possible by the large-orifice restriction nozzle.

As indicated above, the rate of fluid flow through a hydraulic line is determined by the smallest cross-sectional area in the hydraulic line. The smallest cross-sectional area of a hydraulic line is generally referred to as the "orifice" of that hydraulic line. In the context of the embodiments of the invention, therefore, the small-orifice restriction nozzle has a smaller cross-sectional area than the large-orifice restriction nozzle. The large-orifice restriction nozzle therefore allows a faster fluid flow rate than the small-orifice restriction nozzle.

An advantage of the inventive safety stop valve arrangement is that it allows a designer to construct it to have a fast pitch speed and a slow pitch speed at different stages of an emergency stop. This can be achieved in a simple and straightforward manner. The inventive safety stop valve arrangement can be used in various different-sized wind turbines i.e. for hydraulic blade pitch systems—by appropriate choice of the restriction nozzles to achieve the desired "slow" and "fast" fluid flow rates. The term "hydraulic line" as used in the context of the embodiments of the invention may be understood to be a tube or hose that carries hydraulic fluid from the accumulator arrangement to a piston of the blade pitch system. By opening a valve in the hydraulic line, fluid—which is pressurized—is forced through the line as soon as the valve is opened. The fluid flow rate is determined by the relevant restriction nozzle, which determines the rate at which fluid can flow from the accumulator arrangement to the hydraulic piston arrangement. With the inventive safety stop arrangement, a blade can be pitched at different speeds by selectively opening only the safety valves, or by also opening one or more speed-select valves. When only the safety valves are opened, the safety pitch speed can be regarded as a "slow" speed. When a speed-select valve is also opened, the second restriction nozzle ensures that the safety pitch speed is faster, and this can be regarded as a "fast" speed.

The inventive safety stop valve arrangement is fail-safe and performs at a higher safety level than a conventional system, and is also capable of adjusting the pitch speed as necessary to reduce critical structural loading.

According to the embodiments of the invention, a safety stop assembly of a wind turbine—with hydraulic blade pitch systems—comprises such a safety stop valve arrangement for each hydraulic blade pitch system of the wind turbine; a redundant first relay arrangement for actuation of the safety valves in response to a safety stop input; and a redundant second relay arrangement for actuation of the speed-select valves in response to a rotor acceleration input.

An advantage of the inventive safety stop assembly is that it is a fail-safe assembly which fulfils the requirements of ISO 13849-1, and which can be constructed in a straightforward and economical manner. The inventive safety stop assembly can be installed in the hub of the wind turbine. An advantage of the inventive safety stop assembly over the prior art solutions is that the pitch speed control is commanded by a safety system that is entirely independent of the wind turbine controller (or any other controller).

According to the embodiments of the invention, the method of performing a safety stop sequence for a wind turbine with hydraulic blade pitch systems comprises the steps of providing such a safety stop valve arrangement for each hydraulic blade pitch system of the wind turbine; providing a safety stop input in response to an event requiring an emergency shut-down; measuring rotor acceleration and providing a rotor acceleration input; actuating the redundant sets of safety valves in response to the safely stop input; and actuating the speed-select valves in response to the rotor acceleration input.

As long as the speed-select valves are closed, the flow rate of the fluid is limited by the first restriction nozzle, which has a smaller orifice than the second restriction nozzle. As soon as a speed-select valve is opened, however, an additional volume of fluid will be fed into the hydraulic line through the second restriction nozzle, which has a larger orifice, resulting in a faster flow rate for the fluid in the hydraulic line. An advantage of the inventive method is that it provides a straightforward and economical way of ensuring a safe pitching of the blades in response to any kind of shut down event, by determining the nature of the shut down event and then controlling the rate at which hydraulic fluid passes from the pressurized hydraulic accumulators to the hydraulic pistons which actuate the blade pitch motion.

Particularly advantageous embodiments and features of the invention are given by the dependent claims, as revealed in the following description. Features of different claim categories may be combined as appropriate to give further embodiments not described herein.

In the following, without restricting the embodiments of the invention in any way, it may be assumed that the wind turbine has three blades mounted to its hub, and a hydraulic blade pitch system for each rotor blade. It will be understood that the rotor blades are generally pitched in a synchronous manner. The terms "safety stop valve arrangement" and "safety stop arrangement" may be used interchangeably in the following. The safety stop input and the rotor acceleration input may be referred to collectively as the emergency stop inputs in the following.

A valve of the inventive safety stop arrangement may be assumed to be a two-port solenoid valve, i.e. an electromechanically operated valve that is controlled by an electric current through a solenoid. Fluid flow through such a solenoid valve can be switched "on" or "off" by applying an appropriate electrical current to open or close the valve.

A safety valve or a speed-select valve of the inventive safety stop arrangement is therefore actuated by applying a suitable electrical current to the appropriate solenoid coil. The coil actuation signal (i.e. the electrical current) for a valve originates from a corresponding relay. The valve is made to move from one position to another in response to the actuation signal. Whether the valve is "open" or "closed" in response to a coil actuation signal will depend on its construction. Valves which are closed in the absence of a signal are referred to as "normally closed". Valves which are open in the absence of a signal are referred to as "normally open". Each valve is preferably spring-loaded, with a mechanical spring that forces the valve to its "normal" position in the absence of power.

The redundant safety valves are designed to be "normally open" for safety purposes so that a power loss will always lead to activation of a pitching motion out of operation. In other words, the safety valves require power to remain closed.

During healthy wind turbine operation, the safety stop function is not required, and a continually applied signal ensures that these valves remain closed so that fluid cannot flow through the hydraulic line. In the event of a power failure and resulting signal loss, the redundant safety valves will open, thereby initiating a safety stop. In this way, the inventive safety stop assembly ensures that a safety pitch sequence can be automatically initiated in the event of a power loss. Equally, a safety pitch sequence can be intentionally initiated by deliberately removing power from the safety valves, for example during detection of an event such as failure of the wind turbine controller, or in response to a user-activated safety shut-down sequence, etc. Any of these events results in a slowing down of the aerodynamic rotor. The inventive safety stop arrangement ensures that any such event will initiate a safety stop sequence, because the safety valves will return to their "normally open" position as soon as power is removed from the solenoid coils.

A speed-select valve is designed to be "normally-closed", i.e. a specific electrical current is required to open a speed-select valve to allow fluid flow through the second restriction nozzle (with the larger orifice). This ensures that in the event of a signal loss, an unintentionally fast pitching motion of the blades cannot take place. As long as the speed-select valves are closed, hydraulic fluid can only travel through the "slow" line, and the blades are pitched at a slow speed to minimize the effects of negative thrust. However, when a rotor overspeed event (i.e. a positive value of rotor acceleration) is detected, the speed-select valves are also opened, allowing a greater quantity of hydraulic fluid to flow, so that the blades can be pitched more quickly. Such a "fast pitch" safety sequence is only initiated in response to a rotor overspeed, and the choice of one or more "normally-closed" solenoid valves ensures that the "fast pitch" safety sequence cannot be initiated in the event of power loss. This safety feature is particularly advantageous, since it could be very dangerous if the rotor blades were to be pitched at this "fast" speed all the way to a stop position in response to event that requires a "slow" safety stop. The risk of pitching too fast when slow pitch is required is considered worse than the risk of pitching slowly when a faster pitching would be more effective.

In a relatively straightforward embodiment of the invention, an arrangement of relays is used to provide coil actuation signals for the safety valves according to the level of a safety stop input. For example, a redundant arrangement of two series-connected relays may supply power to the solenoid coil of a safety valve. The relays are closed during a "healthy" mode of operation, and open when activated by the safety stop input. In such a series arrangement, if either relay opens, the solenoid coil signal goes from "high" to "low", causing the (normally closed) safety valve to open.

In this embodiment, the outputs of a redundant first set of relays effectively provide coil actuation signals for the redundant safety valves in response to the safety stop input. As long as the safety stop input signal is present (i.e. as a non-zero voltage), the solenoid coils of the safety valves remain powered. The relays will open and remove power from the coils of the safety valves when the safety stop input signal is removed (i.e. drops to zero as a result of a power outage, or in response to a user-initiated shutdown).

Similarly, the outputs of a redundant second set of relays effectively provide actuation signals for the solenoid coils of speed-select valves in response to a rotor acceleration input. The positions of these relays are dependent on the rotor acceleration. For example, the relays can supply power to the solenoid coils of the speed-select valves in the case of positive rotor acceleration, and remove power from the solenoid coils of the speed-select valves in the case of zero or negative rotor acceleration. Of course, any suitable configuration of voltage levels and actuation states is possible, as will be known to the skilled person.

The inventive safety stop assembly preferably comprises an acceleration sensor arranged to provide the rotor acceleration input. This can be a gyroscopic sensor, for example, an accelerometer or a suitable encoder. For purposes of redundancy, one or more such sensors can be located in the hub, generator, and/or in the rotor blades.

In a preferred embodiment of the invention, the safety stop assembly comprises a safety stop device that is adapted to provide an actuation signal for the redundant safety valves of the safety stop valve arrangements in response to a safety stop input, and to provide an actuation signal for the speed-select valves of the safety stop valve arrangements in response to a positive rotor acceleration input. In a particularly preferred embodiment of the invention, the safety stop device of the safety stop assembly is realised as a programmable logic controller (PLC) arranged at the relay outputs and realized to provide an actuation signal for the redundant safety valves and an actuation signal for the speed-select valves. The internal logic of the PLC can be realised to open more than one speed-select valve of a blade pitch system, for example, in order to achieve various different blade pitch speeds during a safety stop sequence.

The accumulator arrangement can comprise a single accumulator. In a preferred embodiment of the invention, the accumulator arrangement comprises several accumulators. For example, the accumulator arrangement can comprise a large accumulator that provides a large volume of fluid when the redundant safety valves are opened, and a smaller accumulator that provides a smaller volume of fluid when the redundant safety valves are opened. The volume of the smaller accumulator is chosen to limit the duration of the "fast-pitch" movement to within a safe range of motion for the rotor blade.

The inventive method preferably comprises a step of disabling a pump station of the hydraulic accumulator arrangement when a safety stop sequence is being carried out. By preventing the accumulator from being replenished, particularly in the case of the smaller accumulator in the embodiment described above, the pitching speed can be kept below an upper limit.

A wind turbine according to the embodiments of the invention can comprise any suitable embodiment of the inventive safety stop arrangement as described above, so that the rotor blades can be pitched to a safe position in a way that avoids damage from excessive rotor thrust on the wind turbine tower.

BRIEF DESCRIPTION

It is to be understood, however, that the drawings are designed solely for the purposes of illustration and not as a definition of the limits of the invention. Some of the embodiments will be described in detail, with references to the following Figures, wherein like designations denote like members, wherein.

In the diagrams, like numbers refer to like objects throughout. Objects in the diagrams are not necessarily drawn to scale.

DETAILED DESCRIPTION

Figure 1:
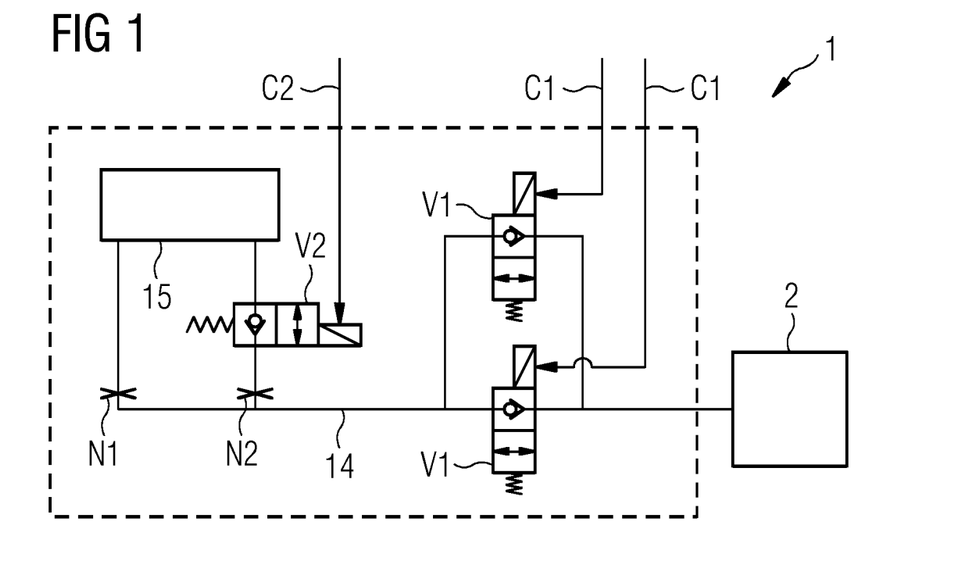
FIG. 1 shows an embodiment of the inventive safety stop valve arrangement in a state of normal wind turbine operation.

FIG. 1 shows part of an embodiment of the inventive safety stop arrangement 1 in a state of normal or "healthy" turbine operation. The diagram shows valves V1, V2 of a safety stop arrangement for one of the blade pitch systems of a wind turbine, and indicates their solenoid coil actuator signals C1, C2. Control signals C1, C2 to solenoid coils of the valves V1, V2 can be generated as will be explained in FIGS. 7 and 8. The diagram also shows a hydraulic accumulator arrangement 15, which comprises one or more accumulators for containing pressurized hydraulic fluid.

In this "normal" state of turbine operation, a signal is applied to the solenoid coils of the "normally open" safety valves V1 to actively keep them closed as indicated by the compressed spring. The "normally closed" speed-select values V2 are in their closed position, as indicated by the extended spring. During normal turbine operation, the blade is pitched in the usual manner by its pitch unit 20, indicated by the block to the right of the diagram. The skilled person will be familiar with the construction or realisation of a blade pitch unit, and this need not be elaborated upon further.

The redundant safety valves V1 can be opened by the coil actuation signal C1 or by a loss of power. These situations are described with the aid of FIGS. 2 and 3. When a safety valve V1 is open, hydraulic fluid will be forced through the fluid line 14, through the open safety valve V1, and into the blade pitch system 2. When a speed-select valve V2 is also opened, an additional fluid volume will be forced through the fluid line 14, through the open safety valve V1, and into the blade pitch system 2. The speed-select valve V2 can be opened by the coil actuation signal C2 as will be explained below.

A first restriction nozzle N1 determines the fluid flow rate from the accumulator arrangement 15 to the piston of the blade pitch system when the safety valves V1 are open. A second, larger restriction nozzle N2 allows a more rapid fluid flow rate from the accumulator arrangement 15 to the piston of the blade pitch system when a speed-select valve V2 is also opened. When a speed-select valve V2 is open, the rate of fluid flow is determined by the larger of the two restriction nozzles, i.e. by the second restriction nozzle N2.

Figure 2:
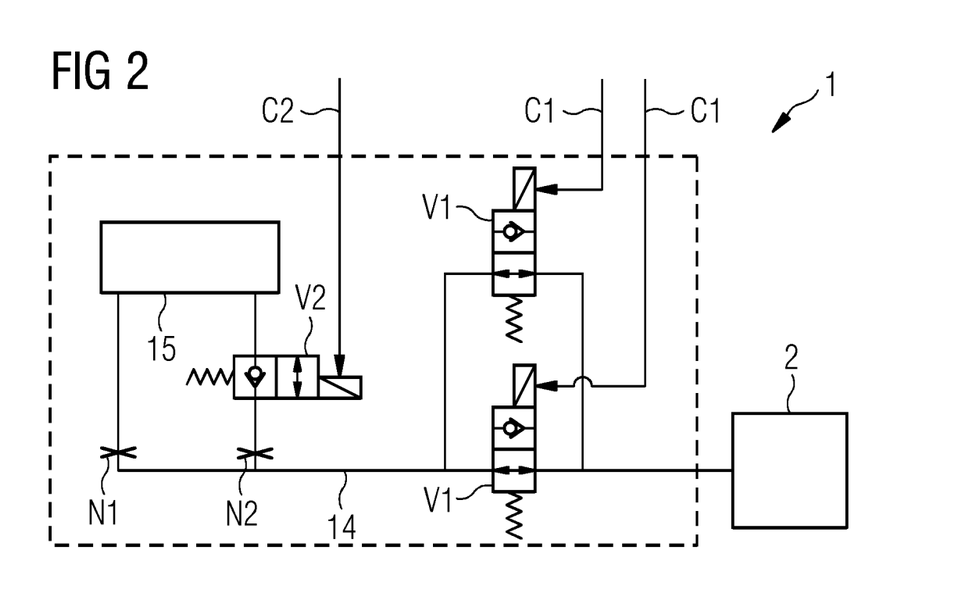
FIG. 2 shows the embodiment of FIG. 1 in a first safety stop sequence.

FIG. 2 shows the same embodiment of FIG. 1 in response to an activation of a safety stop. Here, the redundant safety valves V1 are opened by removal of the coil actuation signal C1. In the case of zero or negative rotor acceleration (i.e. there is no rotor overspeed), the speed-select valve V2 remains closed. In this state, hydraulic fluid is forced through the fluid line 14, through the safety valve V1, and into the blade pitch system 2. Because the volume of hydraulic fluid is limited by the smaller restriction nozzle N1, a "slow" pitch motion results. This can result in a favourable response to a power loss, a user-initiated shutdown etc. to avoid damage resulting from negative rotor thrust.

Figure 3:
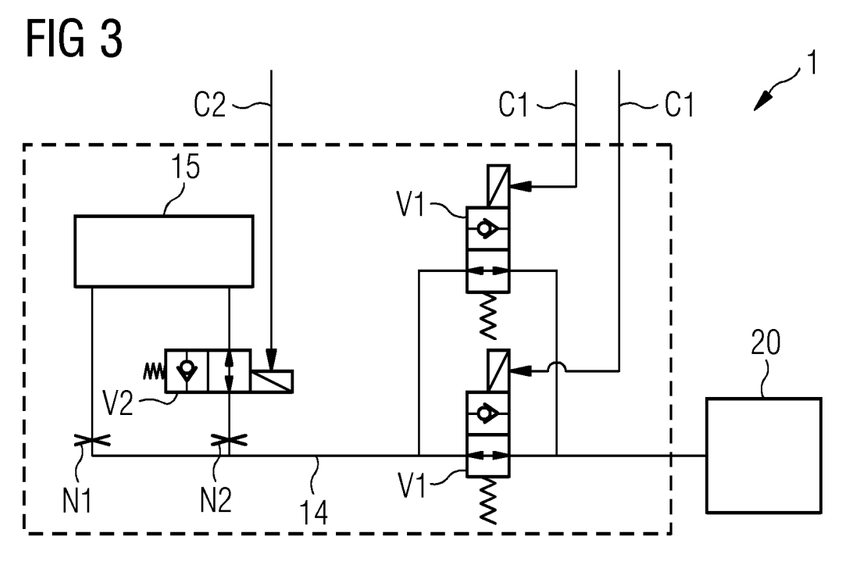
FIG. 3 shows the embodiment of FIG. 1 in a second safety stop sequence.

FIG. 3 shows the same embodiment of FIG. 1 in response to a positive rotor acceleration input. Again, the redundant safety valves V1 are opened by removal of the coil actuation signal C1. In this case, a positive rotor acceleration results in an active coil actuation signal C2 (as will be explained with the aid of FIGS. 7 and 8), so that the speed-select valve V2 is also opened. In this state, an additional quantity of hydraulic fluid is forced through the fluid line 14. The larger restriction nozzle N2 results in a greater rate of fluid flow, achieving a "fast" pitch motion. This can result in a favourable response to rotor overspeed in which the rotor is accelerating as a result of control failure, so that damage from excessive positive rotor thrust can be avoided.

Figure 4:
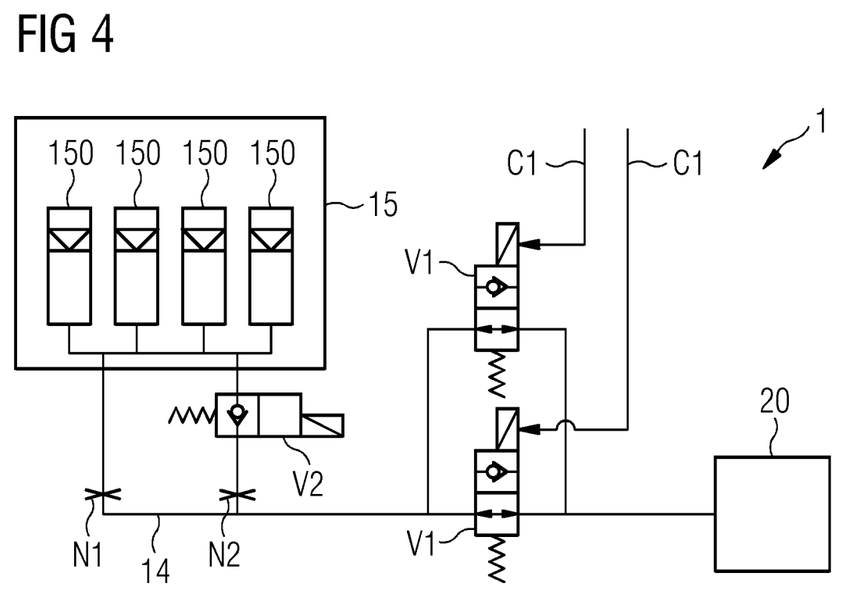
FIG. 4 shows a first hydraulic accumulator arrangement of the inventive safety stop valve arrangement.

FIG. 4 shows one possible realisation of a hydraulic accumulator arrangement 15. Here, a series or array of accumulators 150 all teed the same hydraulic line 14. When a safety stop is initiated as described in FIG. 2, fluid flows through the opened safety valve(s) and into the blade pitch system, at a rate determined by the restriction nozzle N1. When responding to a positive rotor acceleration input as described in FIG. 3, an additional volume of fluid flows through the opened speed-select valve, at a faster rate determined by the larger restriction nozzle N2.

Figure 5:
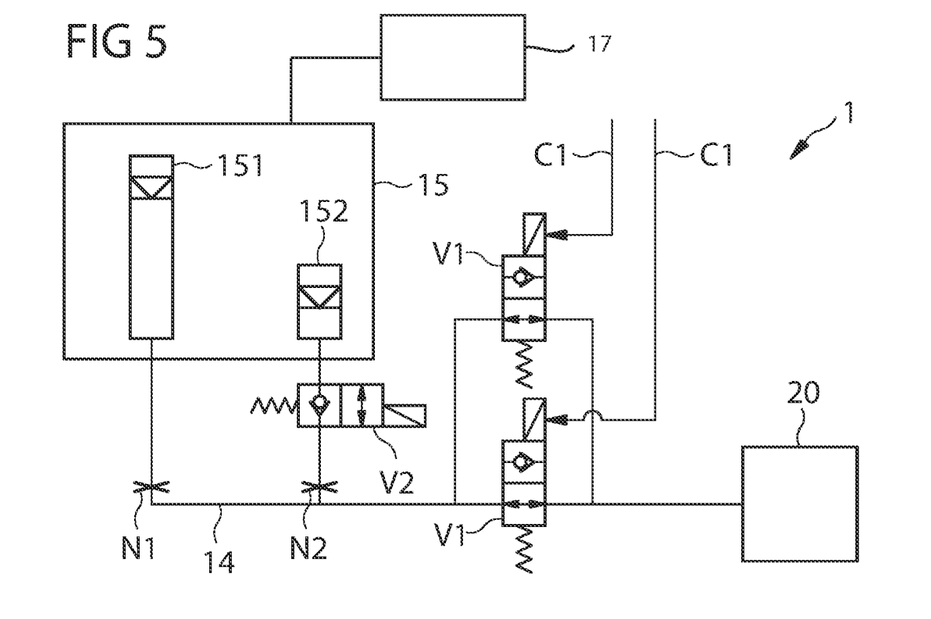
FIG. 5 shows a second hydraulic accumulator arrangement of the inventive safety stop valve arrangement.

FIG. 5 shows a further possible realisation of a hydraulic accumulator arrangement 15. In this embodiment, when a safety stop is initiated as described in FIG. 2, fluid flows from a large hydraulic accumulator 151 through one or both of the opened safety valves and into the blade pitch system. When responding to a positive rotor acceleration input as described in FIG. 3, fluid flows from a smaller hydraulic accumulator 152 through the speed-select valve V2 (at a faster rate determined by the larger restriction nozzle N2), as well as through the opened safety valve(s) and into the blade pitch system. As an additional safety measure, the volume of fluid in the smaller hydraulic accumulator 152 is less than a fluid volume required to pitch the blade through its maximum range.

The inventive method preferably comprises a step of disabling a pump station 17 of the hydraulic accumulator arrangement 15 when a safety stop sequence is being carried out. By preventing the accumulator from being replenished, particularly in the case of the smaller accumulator, the pitching speed can be kept below an upper limit.

Figure 6:
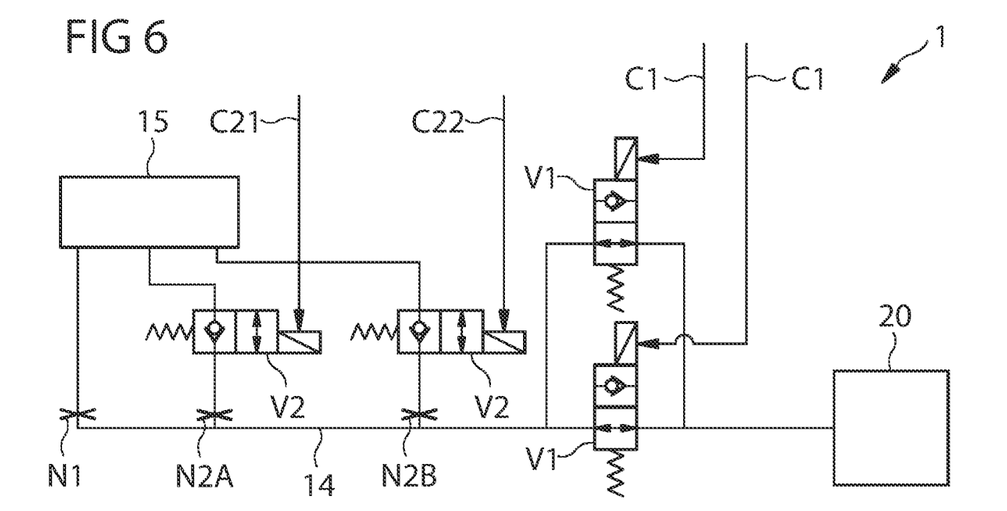
FIG. 6 shows a further development of the embodiment of FIG. 1.

FIG. 6 shows a further embodiment based on any of FIGS. 1-3. Instead of a single speed-select valve V2, it is possible to use two speed-select valves V2 as shown here. This allows various speeds to be achieved for a blade pitch sequence, depending on the nature of the emergency stop. When only the redundant safety valves V1 are opened, the blade pitch speed is slowest, and is determined by the relatively small restriction nozzle N1. When one of the speed-select valves V2 is opened in addition, the blade pitch speed is faster, since the flow rate is now increased by a larger restriction nozzle N2A. When both speed-select valves V2 are opened, the blade pitch speed is increased further, since the flow rate has been increased by the additional restriction nozzle N2B. In this embodiment, two separate coil actuation signals C21, C22 can be supplied, for example from the safety PLC 10 shown in FIG. 7.

In this way, various pitching speeds can be achieved. Even if both of the larger restriction nozzles have the same orifice size, it is possible to achieve three distinct pitching speeds: slow (flow rate is determined by the small-orifice nozzle N1); medium (flow rate is determined by the small-orifice nozzle N1 and either one of the two larger nozzles N2A, N2B), and fast (flow rate is determined by the small-orifice nozzle N1 and both of the two larger nozzles N2A, N2B).

Alternatively, if the large-orifice restriction nozzles have different orifice sizes, it is possible to achieve four distinct pitching speeds: slow (flow rate is determined by the small-orifice nozzle N1); medium (flow rate is determined by the small-orifice nozzle N1 and the "smaller" of the two large-orifice nozzles N2A, N2B); fast (flow rate is determined by the small-orifice nozzle N1 and the "larger" of the two large-orifice nozzles N2A, N2B); and very fast (flow rate is determined by the small-orifice nozzle N1 and both of the two large-orifice nozzles N2A, N2B).

Figure 7:
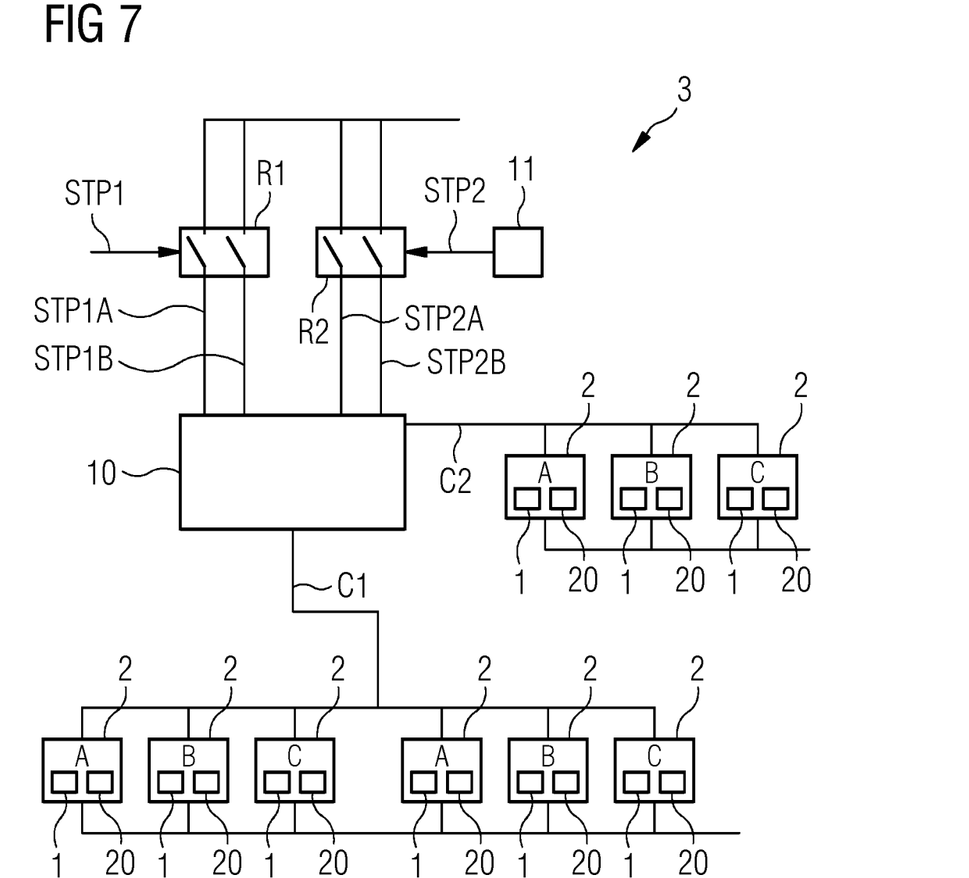
FIG. 7 shows a first embodiment of the inventive safety stop assembly.

FIG. 7 shows a simplified representation of a first embodiment of a safety stop assembly 3 of a wind turbine, realized to generate coil actuation signals C1, C2 for the safety valves V1 and speed-select valves V2 of the safety stop arrangements of three hydraulic blade pitch systems 2, represented by the letters A, B, C. Each blade pitch system 2 is represented by a simple block, and incorporates a hydraulic pitching unit 2 as well as a safety stop arrangement 1 as described in as described in any of FIGS. 1 to 6 above, with two "normally open" safety valves (to ensure redundancy) and at least one "normally closed" speed-select valve. The diagram is not a proper circuit diagram and does not show the complete electrical connection between the solenoid coils and the relays R1, R2.

The diagram shows a redundant first set of relays R1 arranged to control redundant sets of safety valves in response to a safety stop input STP1. During "healthy" turbine operation, two output signals STP1A, STP1B from redundant relay R1 are high. The safety stop input STP1 is removed in the event of a power loss, a user-initiated shut-down sequence, extreme environmental conditions, a failure of the wind turbine control system, etc.

A redundant second set of relays R2 is arranged to control speed-select valves in response to a rotor acceleration input STP2. The rotor acceleration is measured or determined by a suitable sensor or measuring device 11, for example a gyroscopic sensor, accelerometer, encoder etc. As long as the rotor acceleration input STP2 is zero or negative, at least one of two output signals STP2A, STP2B from redundant relay R2 is low. The rotor acceleration input STP2 is present or active when the rotor acceleration is positive, i.e. when the aerodynamic rotor is accelerating. This may occur as a result of an operational failure in the wind turbine control system that allows the generator rotor speed to increase in an uncontrolled manner.

This exemplary embodiment makes use of a safety PLC 10 to generate a coil actuation signal C1 for the solenoid coils of the safety valves, and a coil actuation signal C2 for the solenoid coils of the speed-select valves. The PLC 10, consisting of simple input channels and output channels, can be programmed in a very straightforward manner, with a strict definition relating each possible combination of input signals to the appropriate output signals. In this embodiment, the inputs to the PLC 10 are the pair of parallel signals STP1A, STP1B from redundant relay R1 and the pair of parallel signals STP2A, STP2B from redundant relay R2.

As long as both signals STP1A, STP1B from redundant relay R1 are high (indicating "healthy" turbine operation), the output C1 remains high. However, if either of the signals STP1B from redundant relay R1 goes low (indicating an emergency stop situation), the output C1 will also go low and remain low, thereby opening the safety valves.

The levels of the signals STP2A, STP2B from redundant relay R2 become relevant during an emergency stop situation. As long as either signal STP2A or STP2B from redundant relay R2 is low (indicating non-positive rotor acceleration), the output C2 remains low. However, if both of the signals STP2A, STP2B from redundant relay R2 go high, the output C2 will also go high, thereby opening the speed-select valve(s).

Figure 8:
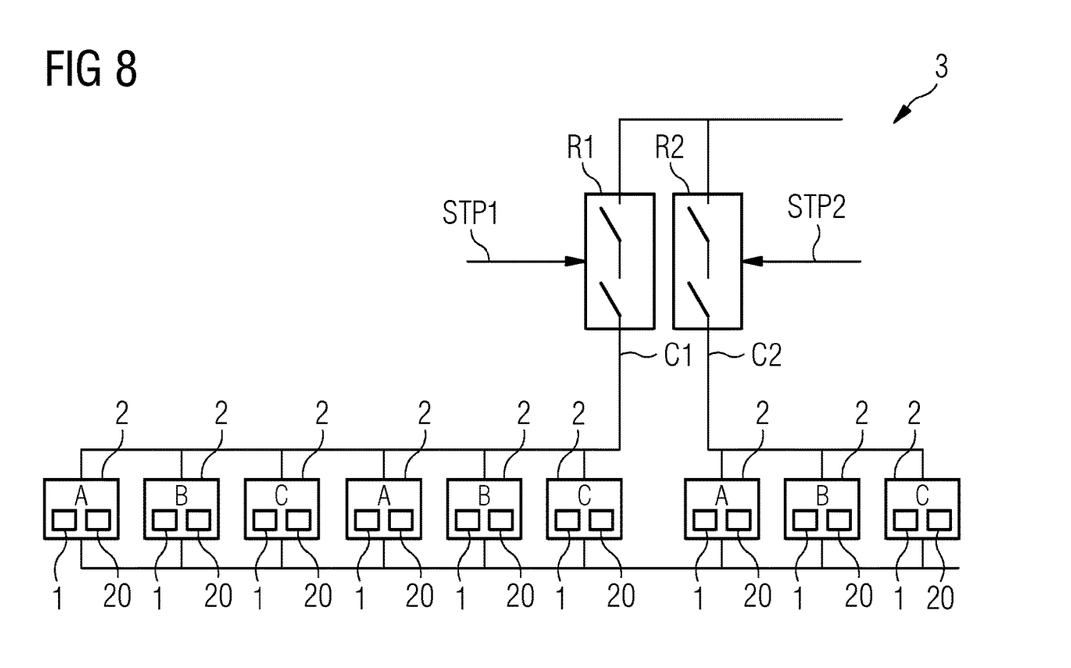
FIG. 8 shows a second embodiment of the inventive safety stop assembly.

FIG. 8 shows an alternative embodiment that does not use a PLC. Instead, a redundant set of relays R1 generates a coil actuation signal C1 to control redundant sets of safety valves in response to a safety stop input STP1, and a redundant set of relays R2 generates a coil actuation signal C2 to control speed-select valves in response to a positive rotor acceleration input STP2. In this embodiment also, the coil actuation signals C1, C2 are used by three blade pitch systems as indicated by the three letters A, B and C. In the same way as described in FIG. 7 above, the first set of relays R1 is arranged to trigger removal of coil actuation signal C1 in response to a safety stop input, and the second set of relays R2 is arranged to trigger generation of a coil actuation signal C2 when a rotor overspeed event is detected during a safety stop.

Figure 9:
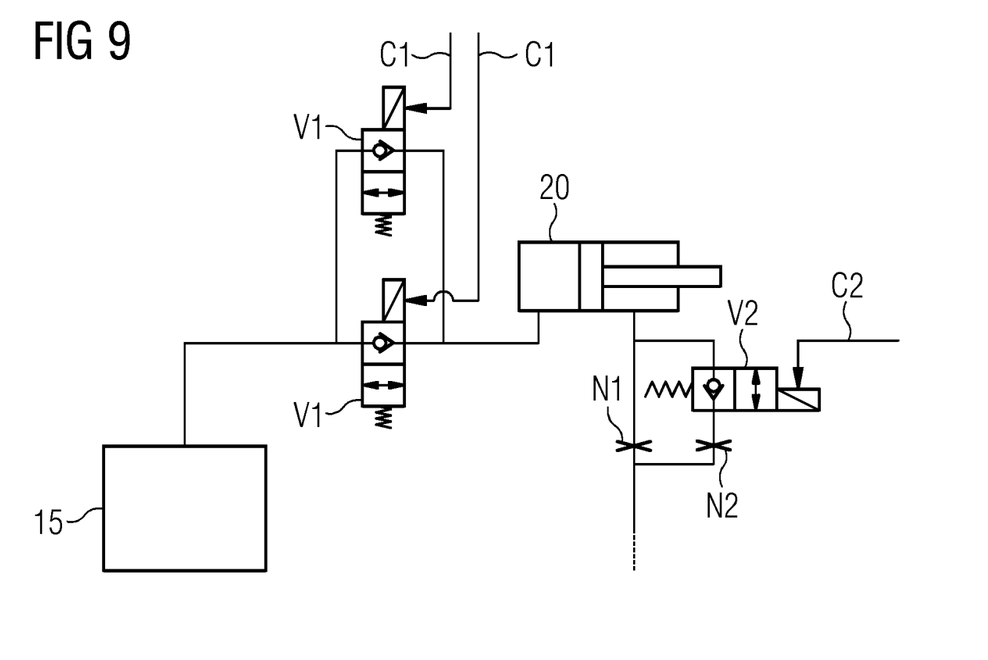
FIG. 9 shows an alternative embodiment of the inventive safety stop valve arrangement.

In the embodiments described above, the flow restriction nozzles and speed-select valves are arranged to restrict the flow of hydraulic fluid into the pitch piston of a rotor blade. FIG. 9 shows an alternative embodiment, in which the flow restriction nozzles N1, N2 and speed-select valves V2 are arranged instead to restrict the flow of hydraulic fluid out of the pitch piston 20. In this embodiment, the speed-select valves V2 and the flow restriction nozzles N1, N2 are arranged in drainage lines of the hydraulic circuit, connecting the piston with a reservoir or tank. The rate of motion of the piston rod within the piston (of the blade pitch system) is controlled by the speed at which the right-hand chamber is drained. When only the small-orifice nozzle N1 is available (a safety valve is open), the chamber drains slowly, and the piston rod also moves slowly. When the large-orifice nozzle is also available (the speed select valve is also open), the chamber drains more rapidly, and the piston rod moves more rapidly also.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A safety stop valve arrangement of a hydraulic blade pitch system of a wind turbine, comprising:
   an accumulator arrangement connected over a hydraulic line to a piston of the hydraulic blade pitch system;
   a redundant set of safety valves arranged between the accumulator arrangement and the piston;
   a first orifice restriction nozzle arranged to determine a first rate of hydraulic fluid flow in response to a safety stop input;
   at least one speed-select valve; and
   at least one second orifice restriction nozzle relatively larger than the first orifice restriction nozzle arranged to determine a second rate of hydraulic fluid flow in response to a rotor acceleration input, wherein the second rate of hydraulic fluid flow is faster than the first rate of hydraulic fluid flow.

2. The safety stop valve arrangement according to claim 1, wherein a safety valve of the redundant set of safety valves is spring-loaded such that the safety valve is open in an absence of power.

3. The safety stop valve arrangement according to claim 1, wherein the at least one speed-select valve is spring-loaded such that the at least one speed-select valve is closed in an absence of power.

4. The safety stop valve arrangement according to claim 1, wherein the accumulator arrangement comprises a first hydraulic accumulator arranged to force hydraulic fluid into the hydraulic line when the redundant set of safety valves are opened, and a second hydraulic accumulator arranged to force hydraulic fluid into the hydraulic line when the at least one speed-select valve is opened.

5. The safety stop valve arrangement according to claim 4, wherein a volume of fluid in the second hydraulic accumulator is less than a fluid volume required for a complete pitch motion.

6. The safety stop valve arrangement according to claim 1, wherein the redundant set of safety valves are two-way solenoid valves.

7. A safety stop assembly comprising:
   a safety stop valve arrangement according to claim 1 for each hydraulic blade pitch system of the wind turbine;
   a redundant first relay arrangement for actuation of the safety valves in response to the safety stop input; and
   a redundant second relay arrangement for actuation of the speed-select valves in response to the rotor acceleration input.

8. The safety stop assembly according to claim 7, comprising a safety stop device configured to provide an actuation signal for the redundant safety valves of the safety stop valve arrangements in response to the safety stop input, and to provide an actuation signal for the speed-select valves of the safety stop valve arrangements in response to the rotor acceleration input.

9. The safety stop assembly according to claim 7, wherein the safety stop device is a safety PLC configured to monitor the inputs and to provide the actuation signals on a basis of the inputs.

10. The safety stop assembly according to claim 7, comprising an acceleration sensor arranged to provide the rotor acceleration input.

11. A method of performing a safety stop sequence for a wind turbine with hydraulic blade pitch systems, the method comprising:
   providing a safety stop valve arrangement according to claim 1 for each hydraulic blade pitch system of the wind turbine;
   providing the safety stop input in response to an event requiring an emergency shut-down;
   measuring rotor acceleration and providing the rotor acceleration input;
   actuating the redundant sets of safety valves in response to the safety stop input; and
   actuating the speed-select valves in response to the rotor acceleration input.

12. The method according to claim 11, further comprising disabling a pump station of the hydraulic accumulator arrangement in response to an input.

13. A wind turbine comprising a plurality of rotor blades and a hydraulic blade pitch system for each rotor blade, and further comprising a safety stop valve arrangement according to claim 1 for each hydraulic blade pitch system.

* * * * *